(No Model.)  2 Sheets—Sheet 1.

C. M. MAXSON.
COMBINED HAY RAKE AND TEDDER.

No. 364,123. Patented May 31, 1887.

WITNESSES:
Chas. Nida
C. Sedgwick

INVENTOR:
C. M. Maxson
BY Munn & Co.
ATTORNEYS.

(No Model.) 2 Sheets—Sheet 2.
C. M. MAXSON.
COMBINED HAY RAKE AND TEDDER.
No. 364,123. Patented May 31, 1887.
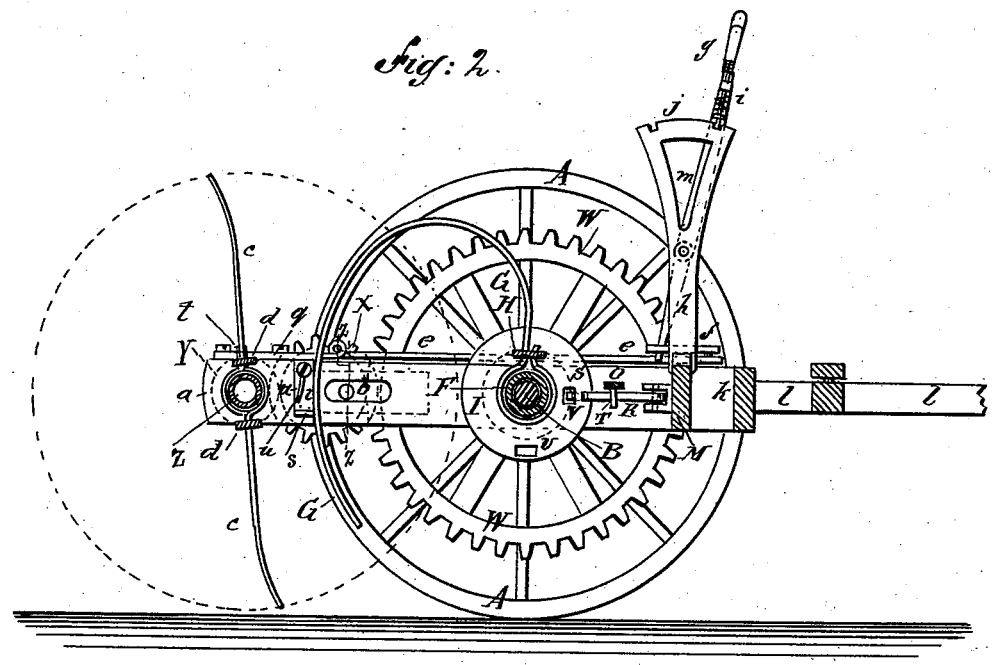
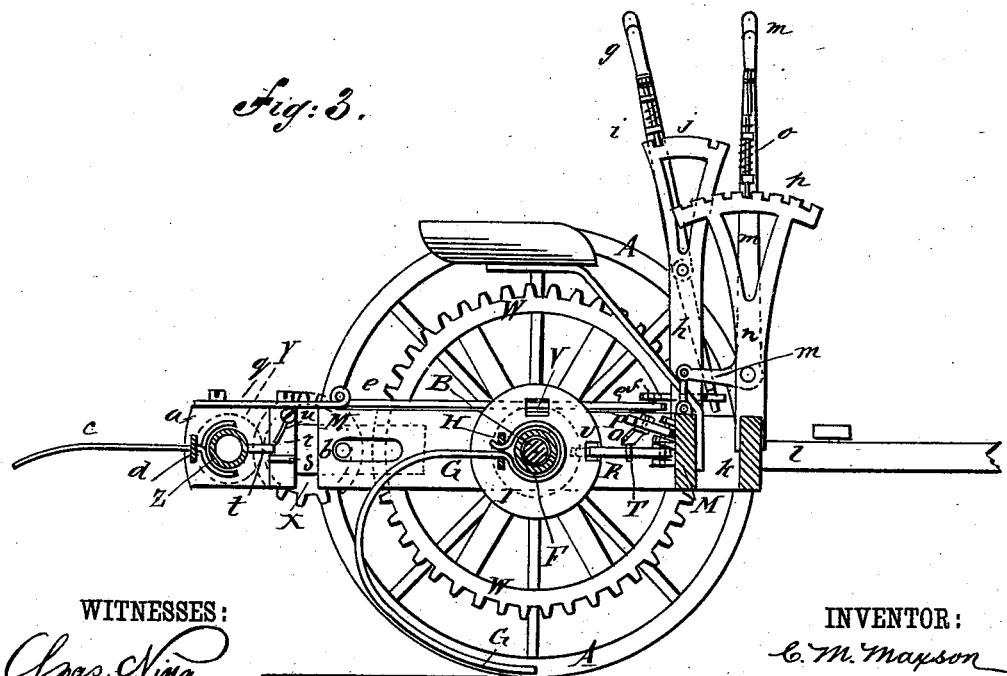
WITNESSES:
INVENTOR:
C. M. Maxson
BY Munn & C.
ATTORNEYS.

United States Patent Office.

CASSIUS M. MAXSON, OF PORTVILLE, NEW YORK, ASSIGNOR OF ONE-HALF TO OLIVER B. LANGWORTHY, OF SAME PLACE.

COMBINED HAY RAKE AND TEDDER.

SPECIFICATION forming part of Letters Patent No. 364,123, dated May 31, 1887.

Application filed May 17, 1886. Serial No. 202,457. (No model.)

*To all whom it may concern:*

Be it known that I, CASSIUS M. MAXSON, of Portville, in the county of Cattaraugus and State of New York, have invented a new and useful Improvement in a Combined Hay Rake and Tedder, of which the following is a full, clear, and exact description.

Reference is to be had to the accompanying drawings, forming a part of this specification, in which similar letters of reference indicate corresponding parts in all the figures.

Figure 1:
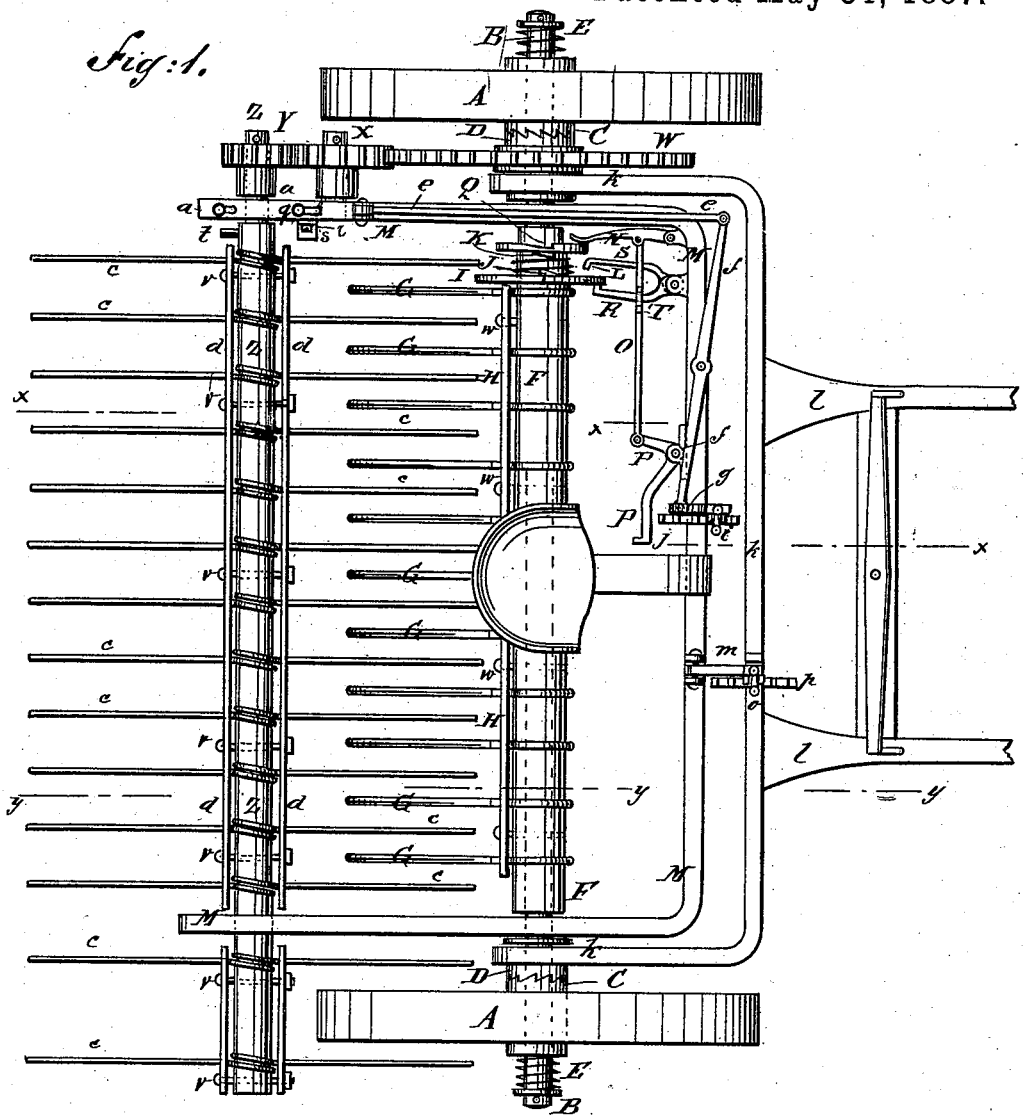
Figure 4:
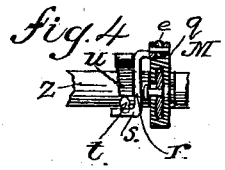

Figure 1 is a plan view of my combined hay rake and tedder. Fig. 2 is a sectional side elevation of the same, taken through the line $x$ $x$ $x$, Fig. 1, and shown arranged as a tedder. Fig. 3 is a sectional side elevation of the same, taken through the line $y$ $y$ $y$, Fig. 1, and shown arranged as a rake. Fig. 4 is a detailed cross-sectional view on the line $z$ $z$ of Fig. 2.

The object of this invention is to provide combined hay rakes and tedders constructed in such a manner that they can be readily adjusted for use as rakes or as tedders, and which shall be reliable in operation in either capacity.

The invention consists in the construction and combination of various parts of the combined rake and tedder, as will be hereinafter fully described.

A are the wheels, which are placed upon the journals of the axle B, and which have clutch-teeth C formed upon the inner ends of their hubs to engage with the teeth of the clutches D, attached to the axle B, so that the said wheels in their forward movement will carry the said axle with them, but can be turned back without turning the said axle. The wheels A are held in gear with the clutches D by spiral springs E, interposed between the outer ends of the hubs of the said wheels, and washers and linchpins at the ends of the said axle.

Upon the axle B is placed a sleeve, F, with which the rake-teeth G are connected. The rake-teeth G are curved in the ordinary manner, and their shanks are passed through short transverse slots in the bar H, are bent around the sleeve F, and their ends are passed through the slots of the bar H and are bent over to keep them in place. The bar H is secured to the sleeve F by screws $w$.

Upon the end of the sleeve F is formed a flange, I, upon the outer side of which, or upon the end of the sleeve F, is formed a clutch-tooth, J, to engage with the tooth of the clutch K, sliding upon the axle B, and connected with the said axle by a tongue and groove, so as to be carried around by and with the said axle in its revolution. The clutch K is held out of gear with the clutch-tooth J by a spiral spring, L, placed upon the axle B between the said clutch K and the end of the sleeve F.

M is a U-shaped bar or frame, in the arms of which are formed, or to them are attached, bearings to receive and ride upon the axle B. To the frame M, near one of its bends, is pivoted the forward end of a lever, N, the rear end of which rests against the outer side of the clutch K, so that by operating the said lever the said clutch can be thrown into gear with the clutch-tooth J, causing the axle B to carry the sleeve F with it, raising the rake-teeth G and discharging the collected hay. To the middle part of the lever N is pivoted the outer end of the connecting-rod O, the other end of which is pivoted to an arm of the elbow-lever P.

The elbow-lever P is pivoted at its angle to the frame M, and its other arm projects into such a position that it can be readily reached and operated by the driver with his foot when he wishes to discharge the collected hay.

In the outer side of the clutch K is formed a recess, Q, in such a position that the lever N will drop into the said recess when the teeth G have been fully raised, and allow the spring L to push the clutch K outward far enough to throw it out of gear and allow the teeth G to drop to the ground. R S are two arms pivoted to the frame M, one of which arms, R, passes through a keeper, T, attached to the connecting-bar O, so that the said arm R will be operated by the movements of the said connecting-bar O. The arms R S are of different lengths, are placed upon the opposite sides of the flange I, and their ends are bent toward each other, so as to enter recesses U V in the said flange I. The recess U is so arranged that the end of the arm R will enter the said recess U when the teeth G are in a working position, and hold the said teeth from rising from the ground until the said arm R is withdrawn by the movement of the connecting-rod O in throwing the clutch K into gear. The longer arm, S, is adapted to be moved into engagement with the recess V, to hold the rake-teeth G in a raised position when passing from place to place and when tedding hay, which movement of the arms S may be effected by the hand of the driver or otherwise.

To the axle B, at the inner side of one of the wheels A, is attached a large gear-wheel, W, the teeth of which mesh into the teeth of the small intermediate gear-wheel, X. The teeth of the gear-wheel X mesh into the teeth of the small gear-wheel Y, attached to the end of the tedder-shaft Z.

The journal of the gear-wheel X is attached to and the journal of the tedder-shaft Z revolves in a bearing formed in or attached to a sheet-bar, a, which slides in a groove formed in the rear part of the arm of the frame M, where it is kept in place by a screw or bolt, b, passing through a slot in the said arm and into or through the said bar, so that the bar a can be readily moved to throw the tedder-driving gearing into and out of gear.

The other end of the tedder-shaft Z revolves in a bearing in the rear end of the other arm of the frame M.

c are the tedder-teeth, the middle parts of which are wound around the shaft Z, and are passed through perforations in the bars d, placed upon the opposite sides of the said shaft Z, and secured to it by bolts v. To an eye-plate, q, secured to the bar a, is pivoted the end of a connecting-rod, e, the other end of which is pivoted to the outer end of a horizontal lever, f. The lever f, at its middle part, is pivoted to the frame M, and at its other end is pivoted to the lower end of an upright lever, g. The lever g is pivoted to a standard, h, attached to the middle part of the frame M, and is held in any position into which it may be adjusted by a spring-pawl, i, connected with it, and which engages with recesses in a catch-bar, j, formed upon or attached to the said standard h, so that the tedder can be thrown into and out of gear by operating the said lever g. k is a U-shaped bar or frame, the ends of the arms of which are provided with bearings to receive and ride upon the axle B, or the hubs of the clutches D. To the middle part of the frame k are attached the shafts l, to which the draft is applied.

With the middle part of the frame M is connected, by a link or other suitable means, the end of the short arm of the elbow-lever m, which is pivoted at its angle to a standard, n, attached to the middle part of the frame k, so that by operating the said lever m the frame M can be adjusted to cause the tedder-teeth to work at the desired distance from the ground, whether the ground be level or inclined. The lever m is held in any position into which it may be adjusted by a spring-pawl, o, connected with it and engaging with the catch-bar p, formed upon or attached to the standard n.

The eye-plate q is slotted to receive the screws or bolts that secure it to the bar a, so that when the lever g is operated to throw the tedder-gearing out of gear the first effect will be to push the said eye-plate a little to the rearward. To the eye-plate q is attached, or upon it is formed, an arm, r, which projects downward, and has a shoulder, s, or other stop, formed upon or attached to its lower end to receive a stop-pin, t, attached to the tedder-shaft Z in such a position as to come in contact with the stop s when the tedder-teeth c are in a horizontal position, so that the inner tedder-teeth will serve as clearers to the rake-teeth. The stop-pin t is kept from rising from the stop s by a spring-catch, u, attached to the upper part of the arm r, and which yields when the said tedder is being revolved into a horizontal position.

When the lever g is operated to throw the tedder-gearing into gear, the first effect is to withdraw the stop s from the pin t and leave the tedder free to be revolved.

Having thus described my invention, what I claim as new, and desire to secure by Letters Patent, is—

1. In a combined hay rake and tedder, the combination, with the wheels A and axle B, the sleeve F, placed upon the said axle, carrying the rake-teeth and provided with the flange I, having recesses U V, the clutch K, engaging with the said sleeve, and the levers N P and connecting-rod O, for operating the said clutch, of the arms R S, pivoted to or connected with the said rod and engaging with the recesses of the said flange, substantially as herein shown and described, whereby the said sleeve will be locked in place when the rake-teeth are in a working position and when they are raised from the ground, as set forth.

2. In a combined hay rake and tedder, the combination, with the wheels A and the axle B, carrying the sleeve F, the rake-teeth G, applied to said sleeve, and the frame M, riding upon the said axle, of the tedder-shaft Z and the tedder-teeth c, said shaft having a stop or pin, t, the gear-wheels W X Y, connecting the said axle and tedder-shaft, the bar a, carrying one end of the tedder-shaft Z and the gear-wheels X Y, and connected by the slotted eye-plate q to the frame M, said bar having a pendent arm, r, provided with a spring-catch, u, and a rearwardly-projecting shoulder or stop, s, directly above which is arranged the said spring-catch, and between which spring-catch and stop is received the stop or pin t of the tedder-shaft, substantially as described.

3. In a combined hay rake and tedder, the combination, with the frame M, the tedder-shaft Z, the sliding bar a, the slotted eye-plate q, and the connecting-rod e and levers f g, of the stop s and the spring-catch u, connected with the said slotted eye-plate, and the pin t, attached to the said tedder-shaft, substantially as herein shown and described, whereby the first effect in throwing the tedder into or out of gear will be to withdraw the stop from the pin of the tedder-shaft or to throw it into position to engage with the said pin, as set forth.

4. In a combined hay rake and tedder, the combination, with the shaft Z and the tedder-teeth $c$, coiled at their centers around the said shaft, of the two bars $d$, perforated to receive the tedder-teeth, and the bolts $v$, securing the said bars to the said shaft, substantially as herein shown and described, whereby the said teeth will be securely connected with the said shaft, as set forth.

CASSIUS M. MAXSON.

Witnesses:
L. D. WARNER,
O. B. LANGWORTHY.